May 1, 1951 — W. H. BACH — 2,551,085

MOTION-PICTURE CAMERA REFLEX VIEW FINDER

Filed March 12, 1946 — 2 Sheets-Sheet 1

INVENTOR
Walter H. Bach
BY Robt. D. Pearson
ATTORNEY

May 1, 1951 W. H. BACH 2,551,085
MOTION-PICTURE CAMERA REFLEX VIEW FINDER
Filed March 12, 1946 2 Sheets-Sheet 2
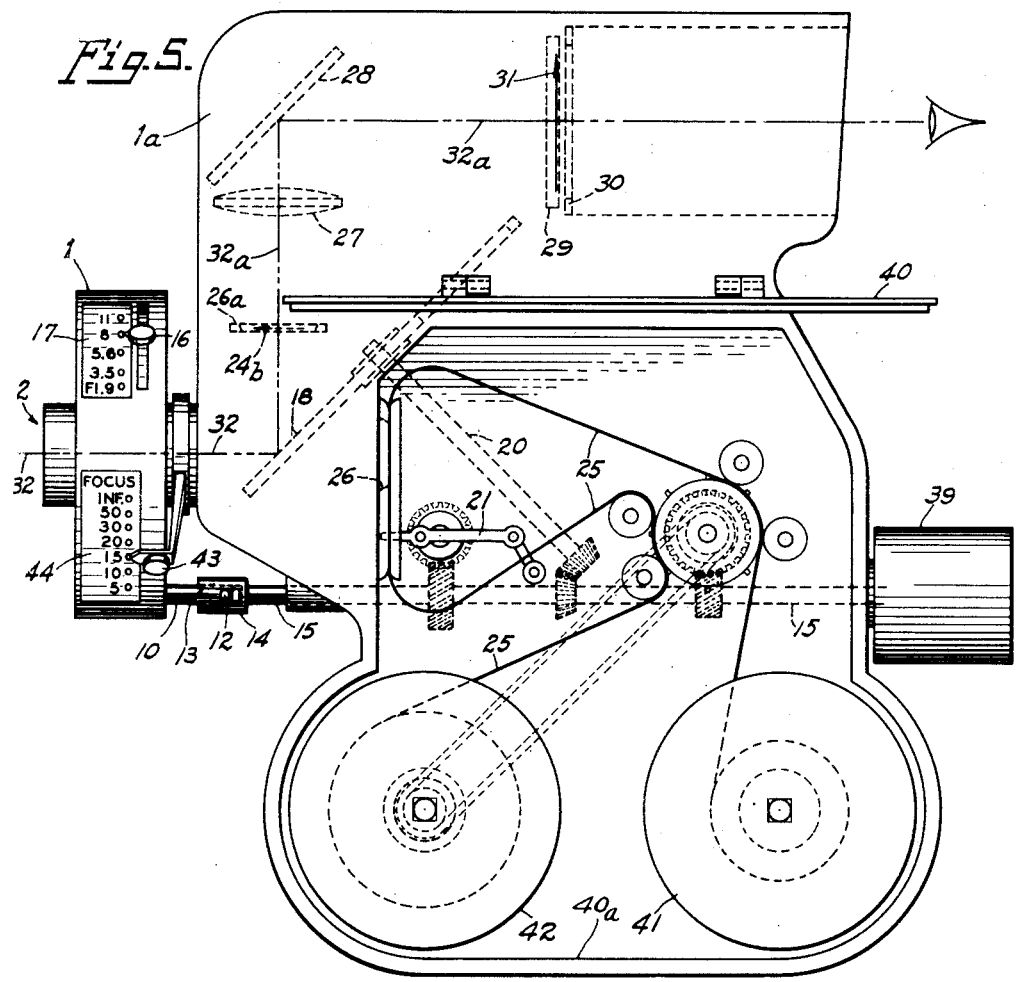
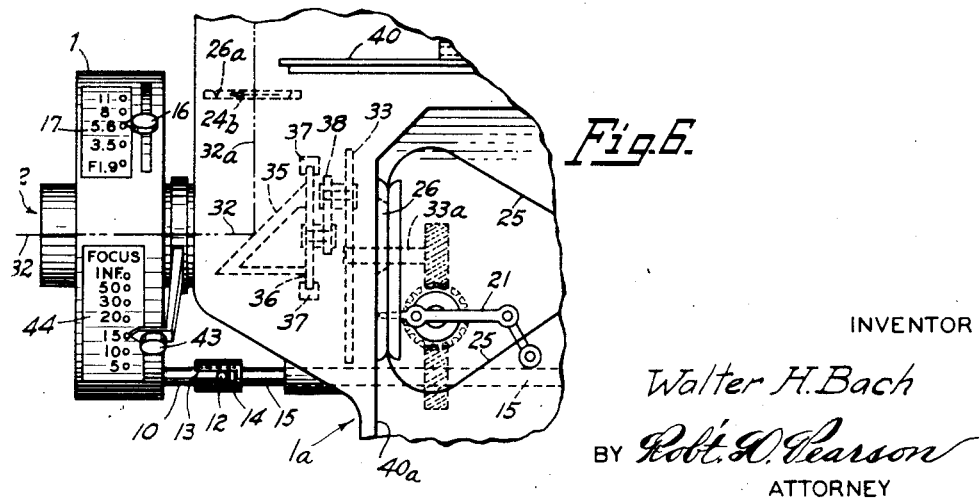
INVENTOR
Walter H. Bach
BY Robt. D. Pearson
ATTORNEY Patented May 1, 1951

2,551,085

UNITED STATES PATENT OFFICE 2,551,085

MOTION-PICTURE CAMERA REFLEX VIEW FINDER

Walter H. Bach, Los Angeles, Calif.

Application March 12, 1946, Serial No. 653,858

23 Claims. (Cl. 88—16)

This invention relates to reflex view finders for motion picture cameras and the like.

In the now well known reflex finder motion picture camera a rotating disc shutter is also a reflector which directs light to a view finder optical system between photographic film frame exposure periods. Since the reflex view finder optical system is employing the camera objective lens to form its view finder image, and this camera objective lens must be operated at small apertures to expose the photographic film correctly in the well known manner, the reflex finder cannot provide a bright view finder image.

The object of my invention is to furnish reflex view finder means which provide a large, bright, upright and correct right-to-left finder image without parallax distortion and which finder image can be used by the camera operator to see and critically focus the object through the camera objective lens at its fully open aperture, while during the same period of time taking a motion picture on film through the same camera objective lens stopped down so that it provides more depth of focus and satisfactory film frame exposure.

The means whereby this is accomplished by the invention will be better understood from a consideration of the following detailed description, of a preferred embodiment thereof, reference for this purpose being had to the accompanying drawing, in which, Fig. 1 is a diagrammatic illustration of a reflex camera finder system in accordance with one form of my invention.

Figs. 5 and 6 illustrate the invention as detailed in Figs. 1 to 4, installed in a camera casing.

Figure 1:
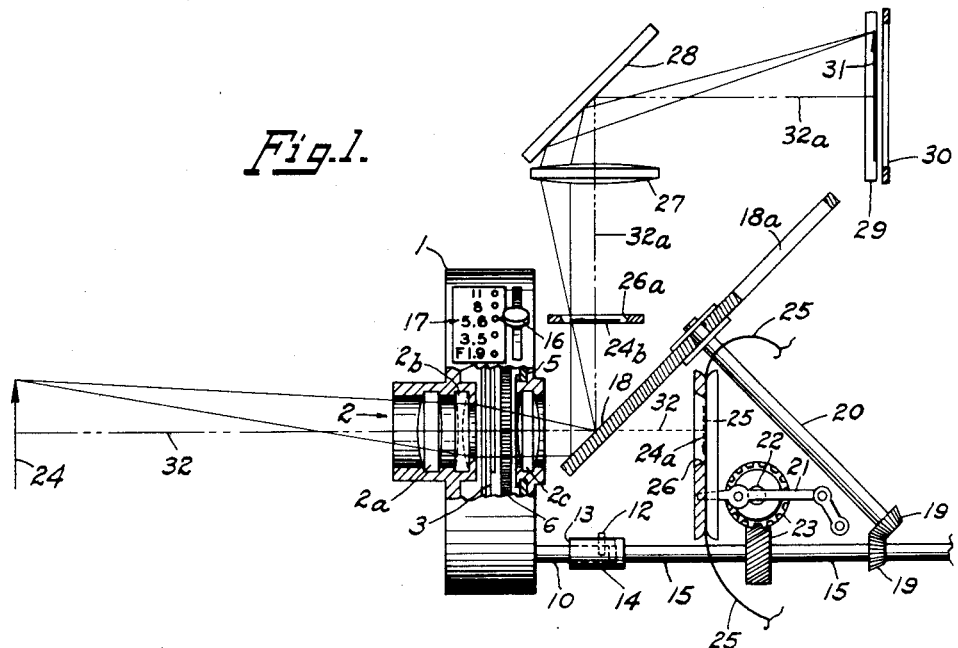

Referring to Fig. 1, a lens casing 1 contains the optical elements 2a, 2b and 2c of a photographic objective lens 2. Included in the casing 1 is a lens diaphragm aperture stop 3 made up of rotatable diaphragm leaves 3a shown in Fig. 2. These diaphragm leaves 3a rotating about the centers of shafts 4 form an aperture stop 3b in photographic objective lens 2 during approximately half the period of rotation, at which time the motion picture film frame exposure is made. For the remainder of the rotation period diaphragm leaves 3a do not form an aperture stop for lens 2 which lens then passes a maximum amount of light for use with a reflex view finder optical system, as shown in Figs. 1 and 5.

Figure 3:
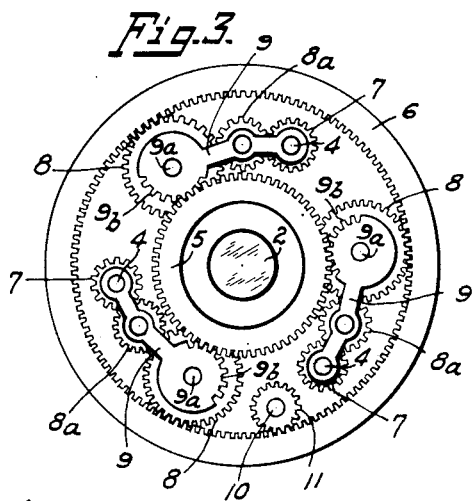

Diaphragm leaves 3a are driven by shafts 4 supported on rotating arms 9 and studs 9a, seen in Fig. 3. Shafts 4 are driven by planetary gears 7 which are in turn driven through idler planetary gears 8a, sun gears 8, internal gear 6 and pinion gear 11 carried by shaft 10 running in bearings supported by lens casing 1. As shown in Fig. 1, Fig. 5 and Fig. 6, the shaft 10 mounts pin 12 which engages a slot 13 in coupling 14 attached to the camera-motor drive shaft 15.

Each complete revolution of shaft 15 causes a complete revolution of each diaphragm leaf 3a in the lens casing 1. The coupling mechanism 10, 12, 13 and 14 allows lens casing 1 to be removed from the camera and replaced when desired without disturbing the phase positions of the diaphragm leaves 3a with respect to the camera mechanism and film moving means. Also when lens casing 1 is in use on the camera, the coupling mechanism 10, 12, 13 and 14 permits casing 1 carrying lens 2 to be moved toward or away from the film for lens focusing purposes in the well known manner.

Referring again to Fig. 3, the gear 5 engages gear segments 9b carried by rotating arms 9, so that partial rotation of gear 5 causes arms 9 to rotate about the studs 9a mounted in lens casing 1. Movement of gear 5 and arms 9 causes shafts 4 to move toward or away from the center of lens 2, and aperture stop 3b formed by diaphragm leaves 3a to vary in size and light transmission. The idler planetary gears 8a are used to maintain the phase positions of diaphragm leaves 3a with respect to the camera mechanism and film moving means, when planetary gears 7 are rotated around the sun gears 8 by the movements of arms 9.

Those skilled in the art will see that a knob 16 as indicated in Fig. 1 can control the position of gear 5, which gear 5 can then be adjusted in position by means of a calibrated scale 17 to enable accurate control of film exposure during the period when diaphragm leaves 3a are forming aperture stop 3b in the lens system 2. For the remainder of the period when no motion picture film frame is being exposed and the film is being moved by pull down mechanism 21, lens 2 will be at fully open aperture to furnish a reflex finder optical system with a maximum amount of light.

The period of formation of aperture 3b in objective lens 2 is synchronized with reflecting shutter 18 driven from shaft 15 by bevel gears 19 and shaft 20 and also synchronized with film pulldown mechanism 21 driven through the shaft 22 and spiral gears 23 from the shaft 15. The reflecting shutter 18 has an opening 18a which admits an image 24a to the photographic film 25 during approximately half its period of rotation. (The shutter 18 and opening 18a are similar in shape to the shutter 33 and opening 34 shown in Fig. 4.) During that portion of the period of rotation of shutter 18 in which the image 24a impinges on film 25, the diaphragm leaves 3a form an aperture 3b in the objective lens 2 and control the exposure and depth of focus of the motion picture being photographed. During the remainder of the period of rotation of shutter 18, the diaphragm leaves 3a do not form an aperture stop for lens 2 which lens admits its maximum amount of light to be reflected by the shutter 18 at an angle along optical path 32a forming an image 24b in finder aperture 26a and passing on to relay lens 27, reflector 28 and ground glass viewing screen 29 to form a bright, right side up, correct right-to-left and enlarged image 31 of the object 24.

A frame 30 can be used in conjunction with viewing screen 29 to indicate the outer boundaries of the picture being taken, or the image of aperture 26a formed by lens 27 on screen 29 can be used for this purpose, either system being adjusted to frame the image 31 in the view finder screen 29 as an enlarged duplicate of the image 24a in aperture 26.

Figure 4:
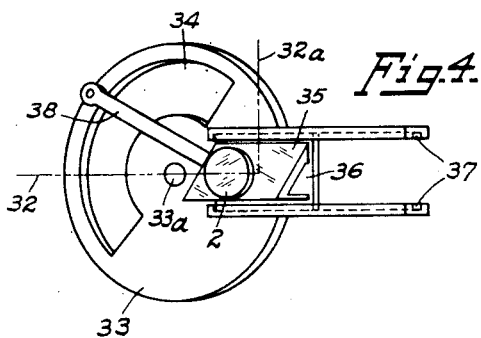
Fig. 4 is a diagrammatic perspective view of a modified form of shutter reflector combination for use with the optical system shown in Fig. 1.

Although Fig. 1 and Fig. 5 illustrate the now well known method of employing a light reflecting shutter 18 to direct an optical image 24b to the view finder system between periods of film frame exposure, other reflecting means may be desirable. One such reflecting mechanism having the advantage of small space requirements which permits use of short focal length photographic objectives, is illustrated in Fig. 4 and Fig. 6; here the well known motion picture camera type of disc shutter 33 supported by and rotating on shaft 33a and having an opening 34 to pass an optical image 24a to film 25 (see Fig. 1), is used in conjunction with a reflecting surface 35 set at an angle to direct light 32 from lens 2 along optical path 32a, in place of shutter 18 shown in Fig. 1. The disc shutter 33 is placed just in front of aperture 26 near the image focal plane of the lens 2.

The reflecting surface 35 is carried by a shuttle plate 36 running in guide channels 37 which are supported by the camera casing 1a. Link bar 38 is pivotally attached at one of its ends to the shutter 33 and at its other end to the shuttle plate 36, moving the shuttle plate 36 and reflecting surface 35 out of the optical path 32 during that portion of the period of rotation of shutter 33 which brings the opening 34 into optical path 32, during which time a film frame exposure is made. For the remainder of the period of rotation of shutter 33 during which time no film exposure is being made, the reflecting surface 35 is moving behind the lens 2 and directing an optical image 24b (Fig. 1) from lens 2 along optical path 32a to form a view finder image 31 on the ground glass screen 29.

It will be understood by those skilled in the art that rotary movement of the reflecting surface 18 or shuttle movement of reflecting surface 35 during the periods in which they are directing an optical image 31 to view finder screen 29 will not effect the sharpness or position of images 24b and 31 in the reflex view finder optical system, as the mechanism positioning the reflecting surfaces 18 (Fig. 1) or 35 (Fig. 4) is so constructed that these reflecting surfaces move in one plane of space only.

From the foregoing description it is believed that the methods of operation of the invention will be apparent. Many variations of the view finder optical system and the photographic objective lens variable aperture are possible. A viewing microscope can be substituted for ground glass screen 29 and relay lens 27. The objective lens 2 variable aperture 3b can be made up of more or less than the three diaphragm leaves 3a shown in Fig. 2, or can be replaced with an iris diaphragm aperture operated to open and close at the proper points of shutter rotation by means of a cam mechanism driven from the camera shaft 15. Also, the type of diaphragm aperture stop made up of two rectangular leaves having triangular shaped openings which when overlapped produce a square opening of variable size, can be used in conjunction with the lens 2 to provide a variable aperture diaphragm, if the two leaves are cam driven to remain at rest in a fixed position during picture film frame exposure and move to maximum opening between film frame exposures.

Figure 2:
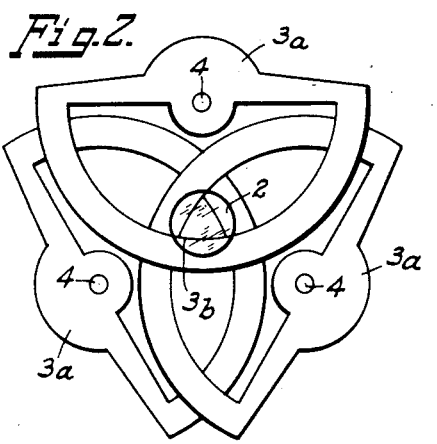
Figs. 2 and 3 show detailed portions of the variable aperture diaphragm mechanism of the potographic objective lens shown in Fig. 1.

The rotating diaphragm leaf 3a mechanism as shown in Figs. 2 and 3 was chosen for illustration as this mechanism has no reciprocating parts and thus permits of quiet operation, an important consideration when producing talking motion pictures and the like.

The motion picture camera 1a (Figs. 5 and 6) is shown with my reflex view finder installed in working relation thereto. The hereinbefore described shaft 15 is coupled to the camera drive motor 39.

The camera door 40 permits accessibility to parts of the film moving mechanism and to the film 25, the door being contoured to fit the opening 40a in the casing 1a.

A conventional film supply spool 41 and take-up spool 42 are operatively positioned in the camera casing as shown.

The lever 43 is operatively mounted with lens assembly 2 in the casing 1a to manually adjust the lens calibration 44 for the focus desired.

I claim:

1. In motion picture apparatus of the class described having a lens and a shutter: means to move said shutter to effect alternate successive periods of open and closed positions thereof; an adjustable light stop for said lens including a plurality of blades rotatable on axes positioned and adapted to effect by successive passages of said blades through the effective area of said lens, alternate and successive periods of open and reduced aperture of said lens; means to move said axes radially of said lens to adjust the size of said reduced aperture; and means connected between said shutter moving means and said rotating blades adapted to synchronize the rotation of said blades and the movement of said shutter whereby to admit relatively increased amounts of light through said lens during the times when said shutter is in said closed position.

2. The structure defined in claim 1 further characterized by having reflex finder means including a reflecting surface adapted to be interposed in the optical path of said lens during said closed period of said shutter.

3. In photographic apparatus of the class described having an objective lens, an adjustable light stop for said lens including: a plurality of movable elements adapted to encroach upon the effective aperture area of said lens whereby to reduce said aperture to a predetermined area; mounting means for said elements adapted to support the same for concurrent motion thereof whereby all of said elements alternately and successively encroach upon and exit from said aperture area; and means to effect radial motion of said mounting means selectively toward or away from the axis of said lens whereby to adjust said reduced aperture area to a predetermined value.

4. The structure defined in claim 3 further characterized by having drive means operatively connected to said elements and adapted to effect said concurrent motion thereof at a substantially uniform rate greater than one encroachment per second.

5. In photographic apparatus of the class described having an objective lens, an adjustable light stop for said lens including: a plurality of movable elements adapted to encroach upon the effective aperture area of said lens whereby to reduce said aperture to a predetermined area; mounting means for said elements including a shaft fixed to each of said elements, a journal bearing for each of said shafts, and drive means interconnecting said shafts for concurrent rotation whereby all of said elements successively encroach upon and exit from said aperture area; and means to effect radial motion of said journal bearings selectively toward or away from the center of said lens whereby to adjust said reduced aperture area to a predetermined value.

6. In photographic apparatus of the class described having an objective lens, an adjustable light stop for said lens including: a plurality of movable elements adapted to encroach on the effective aperture area of said lens whereby to reduce said aperture to a predetermined area; mounting means for said elements adapted to support the same for concurrent motion thereof whereby all of said elements successively encroach upon and exit from said aperture area; and means including a plurality of planetary gear members supporting said mounting means and a ring gear meshed with said planetary gear members to effect radial displacement of said mounting means selectively toward or away from the center of said lens whereby to adjust said reduced aperture area to a predetermined value.

7. The structure defined in claim 6 further characterized by having drive means for said elements including a plurality of driven gears each operatively connected to one of said elements, a drive gear having common driving connection with said driven gears, and means to rotate said drive gear to effect said concurrent motion of said elements at a substantially uniform rate greater than one encroachment per second.

8. In photographic apparatus of the class described having an objective lens, an adjustable light stop for said lens including: a plurality of blades each having an arcuate edge less than 360° in extent adapted to encroach upon the effective aperture area of said lens whereby to reduce said aperture to a predetermined area; mounting means for said blades including a shaft fixed to each of said blades at the center of curvature of said arcuate edge thereof, a journal bearing for each of said shafts, and drive means interconnecting said shafts for concurrent rotation of said blades whereby all of said blades alternately encroach upon and exit from said aperture area; means including a plurality of planetary gear members supporting said journal bearings and a ring gear meshed with said planetary gear members to effect radial displacement of said journal bearings selectively toward or away from the center of said lens whereby to adjust said reduced aperture to a predetermined value; and drive means for said blades including a plurality of driven gears each operatively secured to one of said shafts, a drive gear having common driving connection with said driven gears, and means to rotate said drive gear to effect said concurrent rotation of said blades at a substantially uniform rate greater than one encroachment per second.

9. In motion picture apparatus of the class described having a shutter and a lens with an adjustable light stop: drive means to move said shutter to effect alternate successive open periods and closed periods thereof; a plurality of elements mounted outwardly adjacent the effective area of said lens, said elements each having an aperture edge-defining portion adapted to be positioned within the effective area of said lens whereby said portions cooperate to define a reduced aperture for said lens; aperture adjusting means to move said edge-defining portions in a first direction to adjust the size of said reduced aperture; aperture varying means independent of said adjusting means to move said edge-defining portions in a second direction transverse to said first direction whereby to successively remove and replace said portions in said effective aperture area; and synchronizing means connected between said varying means and said shutter drive means to operate said shutter and varying means in unison whereby said portions are always in said area during said open periods and out of said area during said closed periods of said shutter.

10. The structure defined in claim 9 further characterized by having reflex finder means mounted adjacent the optical axis of said lens, said finder means including a reflecting surface adapted to be moved into the optical path of said lens during each successive closed period of said shutter, and moved out of said path during each successive open period of said shutter.

11. The structure defined in claim 9 further characterized by having reflex finder means including a reflective surface formed on said shutter and adapted to be angularly interposed in the optical path of said lens during each successive closed period of said shutter, and removed from said optical path during each successive open period of said shutter.

12. The structure defined in claim 9 further characterized by having reflex finder means including a movable reflective member operatively connected to said shutter and adapted to be moved into the optical path of said lens during each successive closed period of said shutter, and moved out of said optical path during each successive open period of said shutter.

13. In motion picture apparatus of the class described having a shutter and a lens with an adjustable light stop: drive means to move said shutter to effect alternate successive open periods and closed periods thereof; a plurality of elements mounted outwardly adjacent the effective area of said lens, said elements each having an aperture edge-defining portion adapted to be positioned within the effective area of said lens whereby said portion cooperate to define a reduced aperture for said lens; aperture adjusting means to move said edge-defining portions toward and away from the optical axis of said lens to adjust the size of said reduced aperture; aperture varying means independent of said adjusting means to move said edge-defining portions in a direction tangential to a circle about said lens axis whereby to successively remove and replace said portions in said effective aperture area; and synchronizing means connected between said varying means and said shutter drive means to operate said shutter and varying means in unison whereby said portions are always in said area during said open periods and out of said area during said closed periods of said shutter.

14. The structure defined in claim 13 further characterized by having reflex finder means mounted adjacent the optical axis of said lens, said finder means including a reflecting surface adapted to be moved into the optical path of said lens during each successive closed period of said shutter, and moved out of said path during each successive open period of said shutter.

15. The structure defined in claim 13 further characterized by having reflex finder means including a reflective surface formed on said shutter and adapted to be angularly interposed in the optical path of said lens during each successive closed period of said shutter, and removed from said optical path during each successive open period of said shutter.

16. The structure defined in claim 13 further characterized by having reflex finder means including a movable reflective member operatively connected to said shutter and adapted to be moved into the optical path of said lens during each successive closed period of said shutter, and moved out of said optical path during each successive open period of said shutter.

17. In motion picture apparatus of the class described having a lens and shutter: means to move said shutter to effect alternate successive periods of open and closed positions thereof; adjustable light stop means for said lens which includes a plurality of rotatable blades, each of said blades being adapted upon rotation thereof, to make successive encroachments upon, and retreats from the effective aperture area of said lens, means to mount said blades for synchronized rotation whereby said encroachments are simultaneous and effect a predetermined reduced aperture, and means to move said mounting means to adjust the axes of rotation of said blades inwardly and outwardly from said lens whereby to adjust the size of said reduced aperture; and means connected between said shutter moving means and said blades adapted to rotate the latter and to synchronize the movement of said blades and shutter whereby to admit relatively increased amounts of light through said lens during the times when said shutter is in said closed position.

18. The structure defined in claim 17 further characterized in that said blades each comprise a mounting hub portion, a pair of radial spoke portions extending from said hub portion, and generally sector-shaped band portion connected between outer ends of said spoke portions, the inner edge of said band being arcuate about the center of said hub portion and adapted to define an edge of said reduced aperture.

19. The structure of claim 17 further characterized in that said blade mounting means includes for each blade: an arm mounted for swinging movement about a pivot axis parallel to, and displaced from the optical axis of said lens; and rotary bearing means at an outer end of said arm to support said blade for rotation thereon whereby said blade is adapted to be moved toward and away from said optical axis by said swinging of said arm.

20. The structure of claim 19 further characterized by having a gear portion on said arm concentric with said pivot axis and a single aperture-adjusting gear meshed with all of said gear portions whereby to swing said arms in unison by rotating said adjusting gear.

21. In motion picture apparatus of the class described having a lens and shutter: means to move said shutter to effect alternate successive periods of open and closed positions thereof; adjustable light stop means for said lens which includes a plurality of rotatable blades, each of said blades being adapted upon rotation thereof to make successive encroachments upon, and retreats from the effective aperture area of said lens; means to mount said blades for synchronized rotation whereby said encroachments are simultaneous and effect a predetermined reduced aperture, said mounting means including for each blade, an arm mounted for swinging movement about a pivot axis parallel to, and displaced from the optical axis of said lens, and rotary bearing means at an outer end of said arm to support said blade for rotation thereon whereby said blade is adapted to be moved toward and away from said optical axis by swinging of said arm, whereby to adjust the size of said reduced aperture; and means interconnected between said shutter-moving means and said blades adapted to rotate the latter and to synchronize the movement of said blades and shutter whereby to admit relatively increased amounts of light through said lens during times when said shutter is in said closed position, said interconnected means including for each blade, a driven gear fixed to said blade for rotation therewith about the axis of said rotary bearing means, and an idler gear mounted for rotation on said pivot axis.

22. In photographic apparatus of the class described having an objective lens, an adjustable light stop for said lens including: a plurality of blades each having an arcuate edge less than 360° in extent and adapted upon rotation thereof to encroach upon the effective aperture area of said lens whereby to reduce said aperture to a predetermined area; mounting means for said blades adapted to support the same for concurrent rotation thereof about the centers of curvature of said arcuate edges whereby all of said blades simultaneously and successively encroach upon and exit from said aperture area; and means to effect radial motion of said mounting means selectively toward or away from the axis of said lens whereby to adjust said reduced aperture area to a predetermined value.

23. The structure defined in claim 22 further characterized in that said arcuate edge is concave.

WALTER H. BACH.

REFERENCES CITED

The following references are of record in the file of this patent:

UNITED STATES PATENTS

| Number | Name | Date |
|---|---|---|
| 1,017,250 | Dietz | Feb. 12, 1912 |
| 1,152,238 | Tessier | Aug. 31, 1915 |
| 1,340,557 | Pennypacker | May 18, 1920 |
| 1,547,658 | Kunze | July 28, 1925 |
| 1,602,483 | Freeman | Oct. 12, 1926 |
| 1,854,132 | Ginsberg | Apr. 12, 1932 |
| 1,934,484 | Camilli | Nov. 7, 1933 |
| 1,962,321 | Moreno | June 12, 1934 |
| 2,012,352 | Rusting et al. | Aug. 27, 1935 |
| 2,209,639 | Tonnies | July 30, 1940 |
| 2,262,509 | McNabb | Nov. 11, 1941 |
| 2,297,262 | Tonnies | Sept. 29, 1942 |
| 2,311,822 | Frankel | Feb. 23, 1943 |
| 2,343,015 | Lewis | Feb. 29, 1944 |
| 2,371,524 | Kals | Mar. 13, 1945 |
| 2,380,216 | Carter | July 10, 1945 |